Patented July 28, 1925.

1,547,726

UNITED STATES PATENT OFFICE.

OTTO BILLETER AND ARTHUR STOLL, OF BASEL, SWITZERLAND, ASSIGNOR TO CHEMISCHE FABRIK VORMALS SANDOZ, OF BASEL, SWITZERLAND.

QUININE PREPARATION.

No Drawing.   Application filed September 28, 1923.   Serial No. 665,458.

*To all whom it may concern:*

Be it known that we, OTTO BILLETER and ARTHUR STOLL, both citizens of the Swiss Republic, and residents of Basel, Switzerland, have invented new and useful Quinine Preparations, of which the following is a full, clear, and exact specification.

The fact that the therapeutical dose of quinine is comparatively large, while the solubility of the base and of the ordinary normal quinine salts in water is relatively small, has long ago led to special measures designed to increase the solubility and thus the speed of resorption of the quinine and to enable the production of a sufficiently concentrated solution for injection purposes. A marked increase in the solubility of, for instance, normal or acid quinine hydrochloride in water is obtained by the addition of large amounts of urethane or urea. The acid salts of quinine are more soluble than the neutral salts, although their solubility is not convenient for all purposes; and, moreover, on account of their strong acid reaction they irritate the tissues at the point of injection. Among the normal salts hitherto described quinine ethyl sulfate $C_{20}H_{24}N_2O_2.C_2H_5OSO_3H$ has a fair solubility in water and when freshly dissolved has a neutrol reaction. As, however, on standing and more particularly on heating of the aqueous solution, for instance in sterilization, the acid component undergoes a partial hydrolysis to sulfuric acid, aqueous solutions of quinine ethyl sulfate gradually become more and more acid.

It has now been found that salts of quinine, which are also normal and very readily soluble but more stable, can easily be obtained by using the acids for forming the quinine salts the sulfonic acids of low molecular hydrocarbons, such as the sulfonic acid of methane or ethane ($CH_3SO_3H$ or $C_2H_5SO_3H$.) Such formation of quinine salts may result from the reaction of the free base and free acid or by double decomposition of their salts. The new quinine salts are beautifully crystallizing substances of constitution $C_{20}H_{24}N_2O_2.CH_3SO_3H$ or $C_{20}H_{24}N_2O_2.C_2H_5SO_3H$, which are stable in the air and in aqueous solutions—in which they are weakly alkaline—and also on boiling. They contain 77, respectively 74, per cent of quinine and in respect of solubility, stability, and the reaction of the aqueous solution fulfil without any addition the requirements of the therapeutical use of quinine especially for injection.

Example I.

300 grams of commercial quinine with 3 molecules of water of crystallization are dissolved in two litres of methyl alcohol and acted upon by the theoretical proportion of a ten per cent methyl alcoholic solution of methyl sulfonic acid. After standing for a short time in the cold the methyl sulfonate of quinine separates in the form of long needle-like crystals with a silk-like brightness. The addition of an equal volume of ether and cooling brings about substantially quantitative crystallization. The salt dissolves in three to four parts of water at 20° C. to a clear colorless slightly alkaline liquor. Upon slow heating the substance softens at 214 to 215° C. and melts at 217 to 217.5° C., becoming brownish in color; if the substance is heated more rapidly the melting point is 2° to 3° higher. Analysis showed the proportion of nitrogen to be in one case (I) 6.49 per cent and in another case (II) 6.45 per cent; (in case I, 0.2260 gm. gave 10.48 c. c. of deci-normal ammonia, and in case II, 0.2337 gm. gave 10.76 c. c. of deci-normal ammonia by Kjeldahl's method). The proportion of sulfur was found to be 7.47 per cent (0.1780 gm. gave 0.0968 gm. of $BaSO_4$ by Carius' method). Theoretically the formula

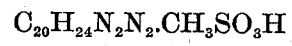
$$C_{20}H_{24}N_2N_2.CH_3SO_3H$$

gives the proportions for N: 6.66 per cent and for S: 7.63 per cent.

Example II.

200 grams of quinine sulfate are dissolved in hot water and mixed with a concentrated aqueous solution of 72 grams of methyl sulfonate of barium. The barium sulfate which separates out is filtered off and the filtrate concentrated under reduced pressure. The methanesulfonate of quinine crystallizes out from the concentrated solution and has the properties of the preparation described in Example I.

Example III.

500 grams of quinine are dissolved in 2.5 litres of alcohol and mixed with 1.4 litres of a 10 per cent alcoholic solution of ethyl sulfonic acid. Upon dilution with ether, the ethyl-sulfonate of quinine separates out in fine needle-like crystals, often united into druses, to the extent of more than 95 per cent of the theoretical yield. The rest of the salt is recovered from the mother liquor by concentration. One part of the salt dissolves in 1½ to 2 parts of water at 20° C. to give a weakly alkaline liquid. The substance softens on slow heating at 214° and melts at 217° C. Upon more rapid heating melting occurs at 2° to 3° higher. Analysis gave the following results: for N (case I) 6.36 per cent; (case II), 6.33 per cent; (in case I, 0.3525 gm. gave 16.00 c. c. of deci-normal ammonia, in case II, 0.4008 gm. gave 18.11 c. c. of deci-normal ammonia by Kjeldahl's method; for S (case I) 7.44 per cent, (case II) 7.43 per cent, (in case I, 0.2200 gm. gave 0.1191 gm. of $BaSO_4$, in case II, 0.2147 gm. gave 0.1162 gm. of $BaSO_4$, by Carius' method); the theoretical proportions for the formula $C_{20}H_{24}N_2O_2.C_2H_5SO_3H$ are N=6.45 per cent, S=7.38 per cent.

*Example IV.*

200 grams of quinine sulfate are dissolved in hot water and mixed with a concentrated aqueous solution of 79.8 grams of ethyl sulfonate of barium. The precipitated barium sulfate is removed by filtration, and the filtrate evaporated in vacuo until the residue solidifies as a mass of fine needle-like crystals. The product has the same properties as the preparation described in Example 3.

What we claim is:—

1. As new products of manufacture, the herein described preparations of quinine consisting of the reaction products of quinine and sulfonic acids of low molecular hydrocarbons, said reaction products being readily soluble in water to a weakly alkaline solution and being stable in air and aqueous solution and on boiling.

2. As a new product of manufacture, the herein described reaction product of quinine and ethyl sulfonic acid.

In witness whereof we have hereunto signed out names this 15th day of September, 1923, in the presence of two subscribing witnesses.

OTTO BILLETER.
ARTHUR STOLL.

Witnesses:
AMAN BRAUN,
MADELEINE SPENGLER.